US012420883B1

(12) United States Patent
Lermant

(10) Patent No.: US 12,420,883 B1
(45) Date of Patent: Sep. 23, 2025

(54) ECONOMICAL BIKE LANE SWEEPER

(71) Applicant: Pierre Lermant, sunnyvale, CA (US)

(72) Inventor: Pierre Lermant, sunnyvale, CA (US)

( * ) Notice: Subject to any disclaimer, the term of this patent is extended or adjusted under 35 U.S.C. 154(b) by 605 days.

(21) Appl. No.: 17/147,285

(22) Filed: Jan. 12, 2021

(51) Int. Cl.
*B62J 50/17* (2020.01)
*B62J 23/00* (2006.01)
*B62J 43/30* (2020.01)
*E01H 1/05* (2006.01)

(52) U.S. Cl.
CPC .............. *B62J 50/17* (2020.02); *B62J 23/00* (2013.01); *B62J 43/30* (2020.02); *E01H 1/056* (2013.01)

(58) Field of Classification Search
CPC ........... E01H 1/056; E01H 1/045; B62J 50/17
See application file for complete search history.

(56) References Cited

U.S. PATENT DOCUMENTS

| | | | | |
|---|---|---|---|---|
| 3,212,118 A | * | 10/1965 | Anderson | E01H 1/056 15/82 |
| 4,914,774 A | * | 4/1990 | Sheehan | A01G 20/43 15/348 |
| 6,360,396 B1 | * | 3/2002 | Chao | E01H 1/105 15/82 |
| 2002/0184721 A1 | * | 12/2002 | Jackson | E01H 1/056 15/82 |
| 2016/0316636 A1 | * | 11/2016 | Kramer | E01H 1/045 |

FOREIGN PATENT DOCUMENTS

| | | | | | |
|---|---|---|---|---|---|
| CN | 108263546 A | * | 7/2018 | ............. | B62K 19/40 |
| KR | 20160001141 U | * | 4/2016 | ............. | E01H 1/056 |

OTHER PUBLICATIONS

KR20160001141U(machine translation) (Year: 2016).*
CN108263546A(machine translation) (Year: 2018).*

* cited by examiner

*Primary Examiner* — Andrew A Horton

(57) ABSTRACT

Various embodiments include a cylindrical brush mounted on a frame supported by a set of wheels positioned behind the brush. A tow bar connects the frame to a tow vehicle. The amount of pressure between the brush and the ground is controllable. The brush rotation is driven by an electric motor. In one embodiment, the brush axis is not orthogonal to the direction of motion, and debris gets pushed to the side as the sweeper moves forward. In another embodiment, the brush axis is orthogonal to the direction of motion and the debris is driven around the brush by a wrap-around guide, into a hopper sitting on the frame behind the brush.

11 Claims, 4 Drawing Sheets

ECONOMICAL BIKE LANE SWEEPER

CROSS-REFERENCE TO RELATED APPLICATIONS

This application claims priority to U.S. Provisional Utility Application 63/012,143, filed Apr. 18, 2020 by the present inventor. The content of the above application is incorporated by reference in its entirety.

BACKGROUND—PRIOR ART

The following is a tabulation of some prior art that presently appears relevant:

U.S. patent DOCUMENTS

| Pat. No. | Kind Code | Issue Date | Patentee |
| --- | --- | --- | --- |
| 3,947,912 | A | Apr. 6, 1976 | Abraham Michaels |
| 20190145071 | A1 | May 16, 2019 | Rodney M. Kramer |
| 7,716,773 | B1 | May 18, 2010 | Gaylord M. Pahl, et al. |
| 7,644,779 | B1 | Jan. 12, 2010 | David J. Templeton, et al. |
| 5,742,968 | A | Apr. 28, 1998 | David Nicholson |
| 10,137,815 | B2 | Nov. 27, 2018 | Arthur Zanini |
| 3,212,118 | A | Oct. 19, 1965 | Charles C Anderson |
| 3,649,982 | A | Mar. 21, 1972 | Donald G Mortensen |

FOREIGN PATENT DOCUMENTS

| Country Code | Patent Number | Kind Code | Issue Date | Patentee |
| --- | --- | --- | --- | --- |
| KR | 101675423 | B1 | Nov. 11, 2016 | 지형권, et al |
| AU | 2005238091 | B2 | Nov. 12, 2009 | Eddie Fitzgerald |

Street shoulders and traditional bike lanes that share pavement with motor vehicles accumulate debris over time, as regular car and truck traffic pushes debris to the edge of the road. As a result, bicycle riders experience bumpy, slippery and prone-to-puncture rides. To avoid these poor conditions, riders tend to merge into the main traffic lanes where the pavement is generally cleaner, creating hazardous situations.

In urban areas, full-sized street cleaners can sweep traditional bike lanes, however for economic reasons they will often only clean the swaths of pavement trafficked by motor vehicles, making the sides of the pavement, where bicycles operate, even dirtier.

Protected bike lanes and bike paths that are separated from motor vehicle pavement can also become unpleasant or hazardous to ride due to objects brought in by other factors, such as leaves, rocks, twigs, mud, or litter and trash left behind.

Because of physical width constraints and environmental reasons, protected bike lanes and bike paths cannot be cleaned by full-sized street sweepers.

Finally, roadsides in-between cities are rarely swept due mostly to economic reasons. In addition, a slow-moving full-sized sweeper may become hazardous to car and truck traffic operating on the same roads at much higher speeds.

To remedy the situations highlighted above, smaller versions of the full-sized street sweepers have been commercialized. They operate like the larger devices yet their reduced width allows them to clean narrow swaths of pavement, like protected bike lanes or bike paths. However, their expensive price tag, cost of operation, maintenance and storage all severely limit their adoption and use.

Some motorized and human-powered walk-behind narrow sweepers have also been commercialized, but their very limited range makes them only suitable for specific environments like airports.

With the near universal expansion of bike lanes and bike paths to curb car traffic, there is a need for an economical bike lane sweeper that can clean all surfaces where bicycles travel.

Specifications; Detailed Description

The drawings described herein are for illustrative purposes only and illustrate only selected embodiments. The enclosed drawings are not intended to limit the scope of the present disclosure. In the brief and detailed description sections, an angled brush refers to a brush whose main axis of rotation is not orthogonal to the sweeper direction of motion, and a straight brush refers to a brush whose main axis of rotation is approximately orthogonal to the sweeper direction of motion.

DETAILED DESCRIPTION OF THE DRAWINGS, FIRST EMBODIMENT

Figure 1:
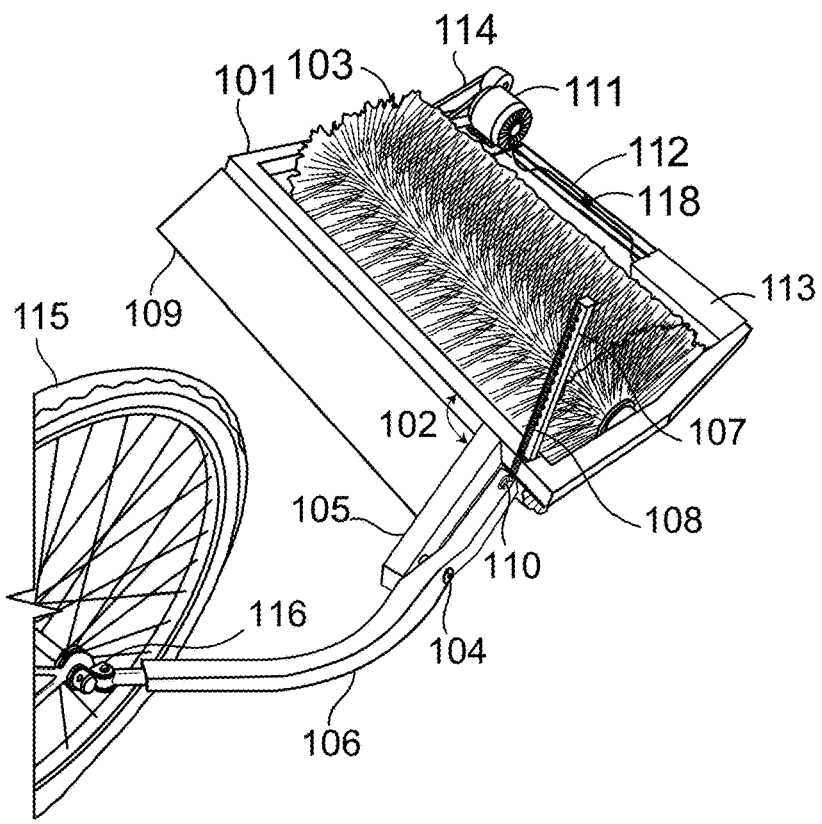
FIG. 1 is a perspective front view of a sweeper with an angled brush.

One embodiment of the sweeper with an angled brush, towed by a bicycle, is illustrated in FIGS. 1, 2, 3, 4 and 5. A frame 101 forming an approximate rectangle and made of rigid material, for instance aluminum, polycarbonate or steel, serves as the main structure of the sweeper (FIG. 1, 2). Extending the front of the frame 101 is an elongated tongue 105 approximately parallel to the direction of motion, attached at a non-right angle 102 to the front of the frame 101.

A cylindrical brush 103 made of a core and sweeping bristles is positioned behind the front of the frame 101 and parallel to it. Debris gets pushed forward and to the right-hand side as the sweeper moves forward. The brush 103 has an axle 302 on each end resting on pillow bearings 301 (FIG. 3) attached to the sides of the frame 101 with standard nuts and bolts. The angle 102 is typically set between 100 and 120 degrees, so that debris gets pushed to the side at an angle between 10 and 30 degrees from the direction of motion. Other angles can be considered. A lower angle 102 will maximize the effective sweeping width. A higher angle 102 will allow for larger volumes of debris to be pushed to the side of the sweeper at a given speed. The effective sweeping width is measured by projecting the width of the angled brush 103 onto a line orthogonal to the direction of motion. For instance, with an angle 102 set to 105 degrees, the effective width is about 0.966 times the width of the brush 103.

Figure 2:
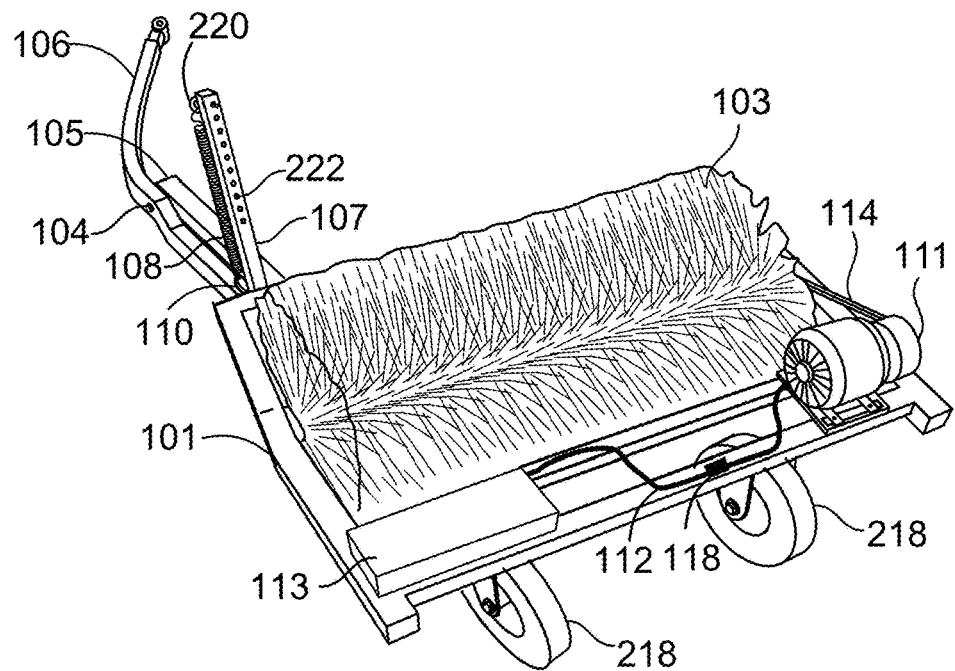
FIG. 2 is a perspective rear view of the sweeper of FIG. 1.
Figure 3:
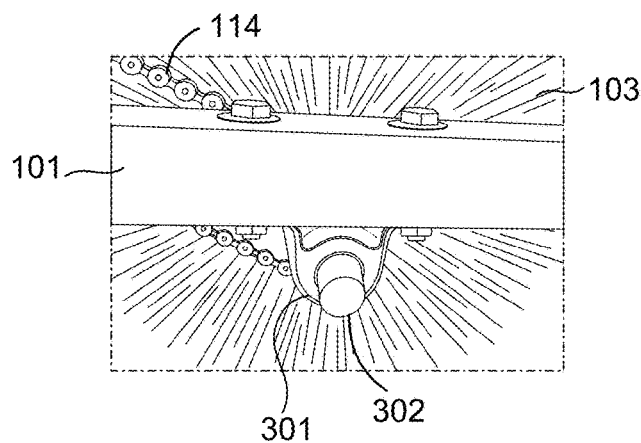
FIG. 3 is a close-up view of a brush axle of the sweeper of FIG. 1, mounted on pillow bearings.

The frame 101 is supported by two wheels 218 positioned at the back of the sweeper. Their axis of rotation is approximately orthogonal to the sweeper direction of motion (FIG. 2). The distance between the two wheels 218 is smaller than or equal to the effective width of the brush 103, so that the overall width of the sweeper at ground level is set by the effective width of the brush 103. This particular wheel 218 positioning allows for the following:

It avoids slippage or friction between the wheels 218 and the ground as the sweeper moves forward.

The wheels 218 roll on a surface that is cleaned by the brush 103 ahead of them, minimizing rolling resistance.

When the surface to be cleaned is bordered by a natural shoulder or a gutter on its right-hand side, the brush 103 can sweep the full pavement width while keeping the wheels 218 on the main pavement.

Since the frame 101 rotates around the axis of rotation of the wheels 218 and the wheels 218 are positioned behind the brush 103, the distance between the brush 103 and the ground can be controlled by adjusting the distance between the front of the frame 101 and the ground.

Figure 5:
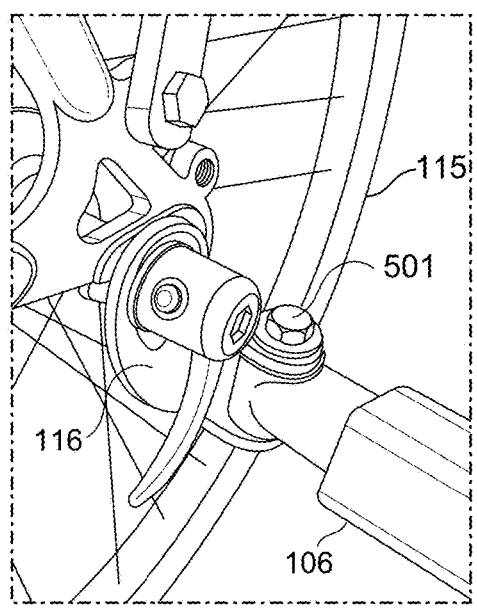
FIG. 5 is a close-up view of the front-end of a tow bar of the sweeper of FIG. 1 attached to a bicycle with a hitch.

An axle-hitch 116 is attached to the rear fork of the bicycle where it meets the wheel 115 axle (FIG. 5). An approximately vertical pin 501 secures the front-end of a side tow bar 106 to the axle-hitch 116. The side tow bar 106 can move around the pin 501 in an approximate horizontal plane. This binding mechanism is similar to those found on some children's bike trailers.

The approximate middle of the side tow bar 106 connects pivotally to the front of the elongated tongue 105 via an approximately horizontal hinge, made of a pin 104 running through the side tow bar 106 and the elongated tongue 105. The front of the frame 101 distance to the ground is controlled by a connector assembly comprising a link 108 made of an extension spring, and an anchor 220 made of an approximately horizontal eye bolt. The bottom of the link 108 is approximately vertically attached to the back-end of the side tow bar 106 with a small hook 110. The top of the link 108 is attached to the anchor 220. The anchor 220 is inserted into one of the holes 222 drilled through an approximately vertical post 107 extending the frame 101 (FIG. 2). The distance between the back-end of the side tow bar 106 and the anchor 220, and therefore the distance between the brush 103 and the ground, can be precisely controlled by having holes 222 closely spaced apart along the post 107. If the brush 103 sits too low, its bristles will wear out fast and the sweeper will be hard to pull due to added resistance. If the contact between the brush 103 and the ground is too light, the sweeping may not be effective.

Figure 4:
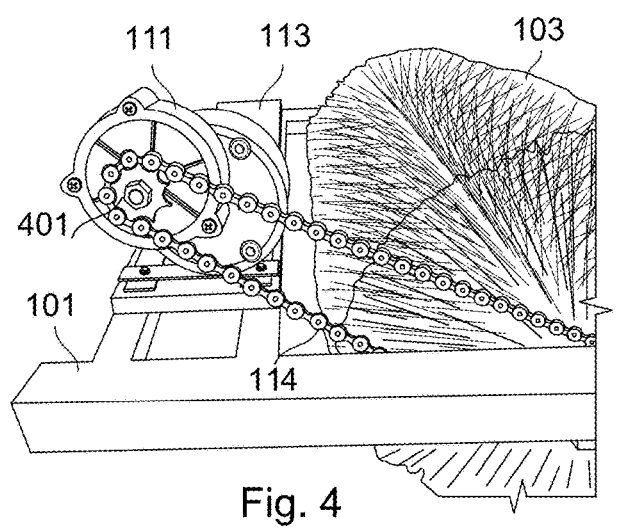
FIG. 4 is a close-up view of an electric motor of the sweeper of FIG. 1, coupled with the brush by a chain and sprockets.

An electric motor 111 affixed to the rear of the frame 101 is coupled with one of the brush 103 axles 302 by a chain 114 and sprocket 401 (FIG. 4, the sprocket attached to brush 103 axle 302 not shown). The brush 103 rotation is opposite to the bicycle rear wheel 115 rotation. The desired brush 103 rotation speed mostly depends on the surface to be cleaned, the angle 102, the outside diameter of the brush 103, the diameter and material of the brush 103 bristles, and the expected sweeper forward speed. Higher rotation speeds tend to provide better cleaning effectiveness, however they result in higher power consumption and more pull resistance.

An angled splash guard 109, made of abrasion resistant material, extends the front of the frame 101 down to prevent debris from being ejected too high and become a hazard.

A battery 113 secured to the frame 101 supplies the power to the electric motor 111 via electrical wires 112. An electrical on/off switch 118 sits between the battery 113 and the motor 111. Given the expected usages of the sweeper, a brush 103 width between 60 cm and 1.5 m (about two to five feet) will be appropriate for most cleaning jobs.

Operation. FIGS. 1, 2, 3, 4 and 5.

On an approximately flat surface, with the bicycle at rest and standing, for instance on a kickstand, the bicycle operator first attaches the front end of the side tow bar 106 to the axle hitch 116. The operator then sets the position of the anchor 220 on the vertical post 107 to achieve a proper height between the brush 103 and the ground. The electric switch 118 is then turned on to spin the brush 103 counter to the direction of motion.

The operator rides the bicycle over the surface to be cleaned. As the spinning angled brush 103 moves forward, debris gets picked up end ejected forward and to the right-hand side of the sweeper. If an area larger than the effective width of the brush 103 needs to be cleaned, the operator will clean it over multiple passes, going from the left to the right of the surface. When the cleaning job is over, the operator dismounts the bicycle and turns off the switch 118.

Since the overall weight of the embodiment is modest and the friction between the brush 103 and the surface to be cleaned is minimized, a reasonably fit operator can sweep multiple kilometers (miles) of bike lanes in a single session with a conventional bicycle. For longer jobs, large brush 103 widths or for uphill terrain the sweeper can be towed by an electric bicycle or any other powered vehicle.

The relatively small size and weight of the sweeper makes it easy to store in one location and transport to and from areas to be cleaned.

DETAILED DESCRIPTION OF THE DRAWINGS, SECOND EMBODIMENT

Figure 6:
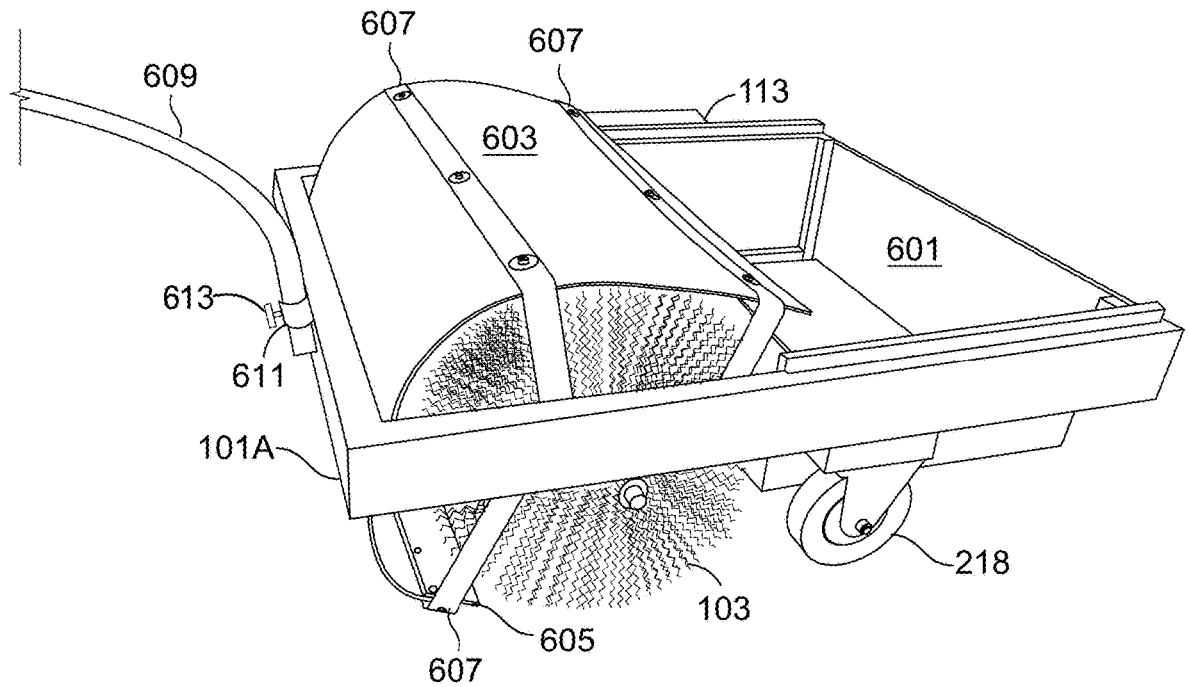
FIG. 6 is a perspective front view of a sweeper with a straight brush and a hopper.
Figure 7:
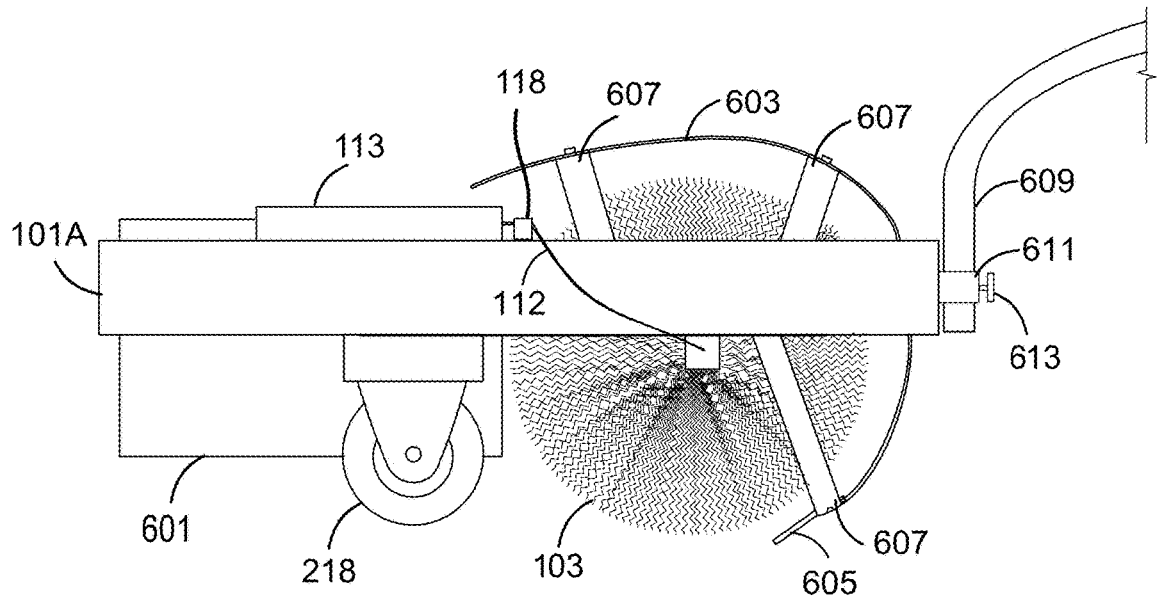
FIG. 7 is a side view of the sweeper of FIG. 6.

An alternative embodiment of the sweeper with a straight brush and a hopper, towed by a bicycle, is illustrated in FIGS. 6, 7, 8 and 9. A frame 101A, forming an approximate rectangle, serves as the main structure of the sweeper (FIG. 6, 7). A cylindrical brush 103 made of a core and sweeping bristles is positioned behind the front of the frame 101A and approximately parallel to it.

The frame 101A is supported by two wheels 218 positioned behind the brush 103. Their axis of rotation is approximately orthogonal to the sweeper direction of motion. The distance between the outside surfaces of two wheels 218 is about the width of the brush 103. This particular wheel 218 positioning provides the same advantages as described in the first embodiment, while allowing a hopper 601 to fit between the wheels 218.

Figure 9:
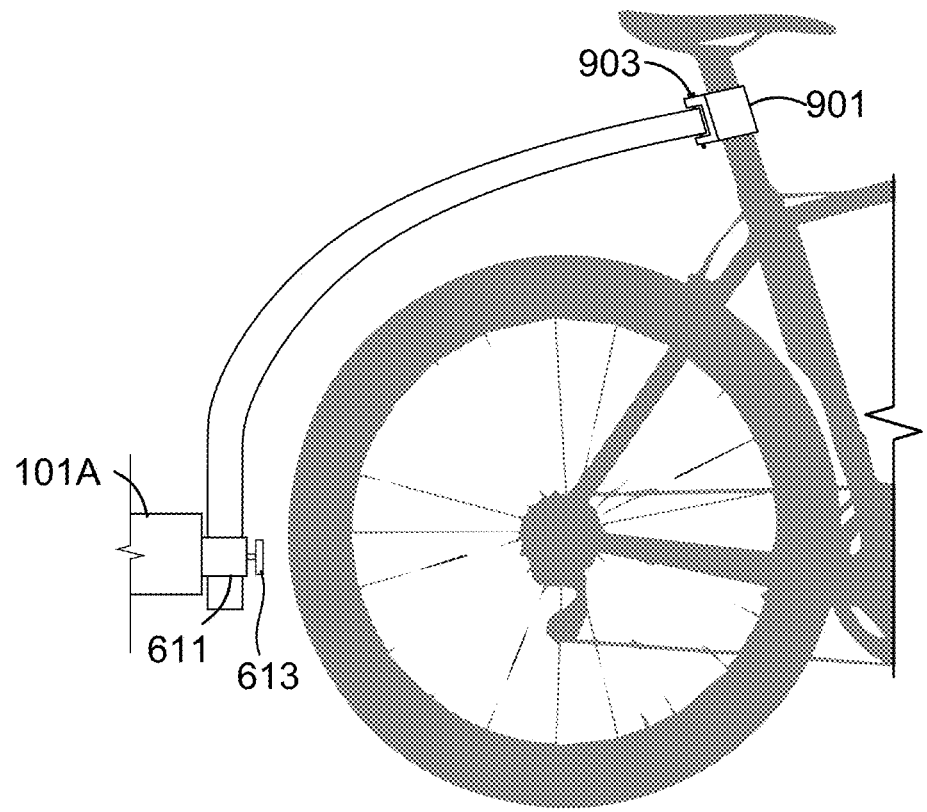
FIG. 9 is a close-up view of the tow bar of the sweeper of FIG. 6 attached to a bicycle seat post and connected to the sweeper frame.

A seat-post hitch 901 is attached to the towing bicycle seat post (FIG. 9). An approximately vertical pin 903 secures the front-end of an elevated tow bar 609 to the seat-post hitch 901. The elevated tow bar 609 can move around the pin 903. This binding mechanism is similar to those found on some children's bike trailers.

The elevated tow bar 609 back-end is approximately vertical. The front of the frame 101A distance to the ground is controlled by a connector assembly comprising a T-shape clamp 613 and a brace 611 attached to the approximate middle of the front of the frame 101A (FIG. 6). The front of the brace 611 has a threaded hole and the clamp 613 extremity is engineered as a screw that fits the thread of the brace 611. The brace 611 and the brush 103 are positioned at a given height above the ground by screwing the clamp 613 into the brace 611 to press the back-end of the elevated tow bar 609 against the inside of the brace 611.

Figure 8:
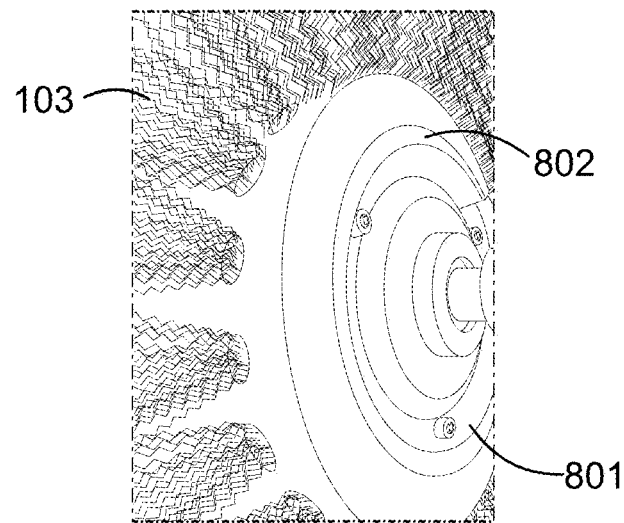
FIG. 8 is a close-up view of a hub motor encased in the brush hollow core of the sweeper of FIG. 6.

A single-shaft hub motor 801 with an outer diameter slightly smaller than the brush 103 hollow core is coated by a layer of flexible material 802 tightly filling the space between the hub motor 801 outer surface and the brush 103 hollow core (FIG. 8). The coupling between the hub motor 801 and the brush 103 is achieved by friction between the outer surface of the hub motor 801, the layer of flexible material 802 and the brush 103 core. The shaft is affixed to one side of the frame 101A and the electrical wires 112 coming out of the shaft are connected to a battery 113 secured to the frame 101A behind the brush 103. An electrical on/off switch 118 sits between the battery 113 and the hub motor 801.

A debris guide 603, held in place by brackets 607 attached to the frame 101A, wraps around the brush 103, leaving a small gap between the extremity of the bristles and the guide 603 (FIG. 6). A flexible lip 605 at the front of the guide 603 makes a light and angled contact with the ground. Debris swept by the rotating brush 103 gets trapped between the brush 103 and the guide 603 and eventually gets dumped into the hopper 601 resting on the frame 101A.

Operation. FIGS. 6, 7, 8 and 9.

On an approximately flat surface, the bicycle operator first attaches the front-end of the elevated tow bar 609 to the bicycle seat-post hitch 901. After the operator determines the proper height between the brush 103 and the ground, he/she secures the back-end of the elevated tow bar 609 inside the brace 611 by tightly screwing the clamp 613 into the front of the brace 611. The electrical switch 118 is then turned on to spin the brush 103 counter to the direction of motion. The operator rides the bicycle over the surface to be cleaned, typically at a low speed. As the spinning brush 103 moves forward, debris gets picked up and is channeled to the back of the guide 603 where it falls into the hopper 601. When the cleaning job is over or when the hopper 601 is full, the operator dismounts the bicycle, turns off the switch 118 and empties out the hopper 601.

CONCLUSION, RAMIFICATIONS, AND SCOPE

Accordingly, the reader will see that the tow-behind sweeper of the various embodiments exhibits the following advantages:
- Its simple design, its few and inexpensive parts make it an economical sweeper to make, operate and maintain.
- Its modest weight and pull resistance allow even low-power vehicles to tow the sweeper over significant distances.
- Its tow bar can be easily attached to a variety of vehicles of different sizes.
- Its connector assembly allows for fine tuning of the distance of the brush above the ground to achieve effective sweeping while minimizing the pull resistance.
- Its modest dimensions and weight make it easy to transport.

The angled brush embodiments will be preferred when the bike lane or path is bordered by a gutter or natural shoulder and the swept debris does not have to be picked up by the sweeper.

The straight brush embodiments with a hopper will be preferred for protected bike lanes sandwiched by concrete separators, or when the debris cannot be left on the side of the device and needs to be picked up by the sweeper.

Additionally, the sweeper can operate on other surface areas, like sidewalks, golf courses or industrial floors.

While the above detailed descriptions contain many specifics, there should not be construed as limitations of the scope, but rather as an exemplification on two embodiments thereof. Many other variations are possible, for example:

The first embodiment of the sweeper with an angled brush can have the angle between the direction of motion and the front of the frame be less than 90 degrees, for instance between 60 and 80 degrees. As the sweeper moves forward, debris gets swept to the left instead of the right.

In the first embodiment of the sweeper with an angled brush, the spring provides a suspension-like behavior where the brush will follow the relief of an uneven surface. For even surfaces, the spring can be replaced by a cable. The anchor may also be a brace tied securely around the frame instead of an eye bolt inserted in a hole.

The first embodiment of the sweeper with an angled brush can have the electric motor affixed to the frame replaced by the single-shaft hub motor inside the brush core described in the second embodiment.

The second embodiment of the sweeper with a straight brush can have the single-shaft hub motor inside the brush core replaced by the electric motor affixed to frame described in the first embodiment.

The first embodiment of the sweeper with an angled brush can have the tow bar, hitch and connector assembly replaced by their equivalent described in the second embodiment.

The second embodiment of the sweeper with a straight brush can have the tow bar, hitch and connector assembly replaced by their equivalent described in the first embodiment.

The second embodiment of the sweeper with a straight brush can have the one axle resting on pillow bearings replaced with a second single-shaft hub motor inside the brush, to increase rotational torque.

The first embodiment of the sweeper with an angled brush can have a belt instead of a chain and pulleys instead of sprockets to drive the brush rotation.

The first embodiment of the sweeper with an angled brush can have the sides of the frame, the elongated tongue and the wheels' plane all parallel to each other and parallel to the direction of motion. The brush axis of rotation forms the same not orthogonal angle with the direction of motion. The brush axles rest on pillow bearings that are attached to the side of the frame at an angle approximately defined by: angle between front of frame and direction of motion minus 90 degrees, typically between 10 and 30 degrees.

I claim:

1. A tow-behind sweeper comprising:
   i) A frame supported by a plurality of wheels, a wheels' axis of rotation, wherein a direction of motion of the sweeper forms an approximate right-angle with said wheels' axis of rotation,
   ii) A tow bar having a front-end and a back-end, said front-end is attached to a tow vehicle and a mechanical connection connects said back-end with said frame,
   iii) A cylindrical brush assembly connected to said frame, said brush assembly has an axis of rotation iv) An anchor, whereby said anchor position controls the amount of pressure between said brush assembly and the ground,
v) A link, a tongue protruding from said frame, wherein said tow bar is pivotably attached to said tongue, and said tow bar is pivotably attached to said link,
vi) A rotational-energy generating electric motor substantially within the frame,
vii) A coupling for transferring said electric motor rotational-energy to said brush assembly, whereby a rotation direction of said brush assembly is opposite to a rotation direction of said wheels.

2. The sweeper of claim 1 wherein said coupling is achieved by a chain and sprockets.

3. The sweeper of claim 1 wherein said coupling is achieved by a belt and pulleys.

4. The sweeper of claim 1 wherein said coupling is achieved by a direct connection.

5. The sweeper of claim 1 wherein said mechanical connection is a clamp.

6. The sweeper of claim 1 wherein said axis of rotation of said brush assembly forms an approximate right-angle with said sweeper direction of motion.

7. The sweeper of claim 6 further comprising a hopper behind said brush assembly supported by said frame, a guide wrapping around said brush assembly, whereby debris picked up by said brush assembly as it moves forward is channeled into said hopper.

8. The sweeper of claim 1 wherein said axis of rotation of said brush assembly does not form a right-angle with said sweeper direction of motion, wherein said wheels' axis of rotation forms an angle with said brush assembly's axis of rotation.

9. The sweeper of claim 8 further comprising a debris splash guard attached to the front of said frame, running approximately the width of said frame to keep debris close to the ground as it is swept forward and to the side by said brush assembly.

10. The sweeper of claim 1 wherein said tow vehicle is a bicycle.

11. The sweeper of claim 1 wherein said tow vehicle is powered by a battery, said battery also powers said electric motor.

* * * * *